(12) United States Patent
Cronvall

(10) Patent No.: US 9,983,086 B2
(45) Date of Patent: May 29, 2018

(54) CALIBRATION UNIT FOR A ROLLER NIP GAUGE

(71) Applicant: Nip Control AB, Saltsjöbaden (SE)

(72) Inventor: Leif Cronvall, Kivik (SE)

(73) Assignee: Nip Control AB, Saltsjöbaden (CH)

( * ) Notice: Subject to any disclaimer, the term of this patent is extended or adjusted under 35 U.S.C. 154(b) by 159 days.

(21) Appl. No.: 15/112,470

(22) PCT Filed: Jan. 13, 2015

(86) PCT No.: PCT/SE2015/050015
§ 371 (c)(1),
(2) Date: Jul. 19, 2016

(87) PCT Pub. No.: WO2015/108471
PCT Pub. Date: Jul. 23, 2015

(65) Prior Publication Data
US 2016/0334296 A1 Nov. 17, 2016

(30) Foreign Application Priority Data

Jan. 20, 2014 (SE) ........................ 1450052

(51) Int. Cl.
*G01L 25/00* (2006.01)
*B41F 33/00* (2006.01)
*G01L 5/00* (2006.01)
*G01B 21/04* (2006.01)
*G01L 1/22* (2006.01)
(Continued)

(52) U.S. Cl.
CPC .............. *G01L 25/00* (2013.01); *B41F 33/00* (2013.01); *G01B 21/042* (2013.01); *G01L 5/0085* (2013.01); *G01D 18/00* (2013.01); *G01G 23/01* (2013.01); *G01L 1/22* (2013.01); *G01L 1/225* (2013.01)

(58) Field of Classification Search
CPC ....................................................... G01L 25/00
USPC ........................................................... 73/1.15
See application file for complete search history.

(56) References Cited

U.S. PATENT DOCUMENTS 4,016,756 A * 4/1977 Kunkle ..................... G01L 1/22
  33/657
4,945,772 A * 8/1990 Shepard ................. B21B 38/08
  73/862.55
(Continued)

FOREIGN PATENT DOCUMENTS

CH 659595 A5 2/1987
DE 1944446 3/1971
(Continued)

OTHER PUBLICATIONS

Cronvall, Leif, 'Roller Nip Gauge', PCT WO 2003027623, World Intellectual Property Organization, Apr. 3, 2003, 27 pages.*

*Primary Examiner* — Clayton E Laballe
*Assistant Examiner* — Kevin Butler
(74) *Attorney, Agent, or Firm* — Capitol City TechLaw

(57) ABSTRACT

The present invention concerns a calibration unit (1, 37) for a roller nip gauge. The roller nip gauge has sensors for length or force measurement. The calibration unit (1, 37) comprises an upper part (3) and a lower part (2). The calibration unit (1, 37) has means to place a part acting on a sensor element (26) of a sensor (25) during calibration in parallel with a surface (9) of the calibration unit (1, 37) receiving the sensor (25).

14 Claims, 4 Drawing Sheets

(51) Int. Cl.
  *G01G 23/01* (2006.01)
  *G01D 18/00* (2006.01)

(56) References Cited

U.S. PATENT DOCUMENTS

| | | | | |
|---|---|---|---|---|
| 5,821,433 A | * | 10/1998 | Goldman | G01L 5/0085 73/862.55 |
| 6,205,369 B1 | * | 3/2001 | Moore | G01L 5/0085 162/252 |
| 2004/0099042 A1 | * | 5/2004 | Gustafson | G01G 21/28 73/1.14 |
| 2004/0244609 A1 | * | 12/2004 | Muhs | D21F 3/04 100/156 |
| 2008/0191719 A1 | * | 8/2008 | Krier | G01L 5/0085 324/699 |
| 2016/0334296 A1 | * | 11/2016 | Cronvall | B41F 33/00 |

FOREIGN PATENT DOCUMENTS

| | | | | |
|---|---|---|---|---|
| JP | H0934301 | * | 2/1997 | G03G 15/20 |
| JP | 2005010040 | * | 1/2005 | G01B 7/02 |
| WO | 03027623 A1 | | 4/2003 | |
| WO | 2014007704 A1 | | 1/2014 | |
| WO | 2014070986 A1 | | 5/2014 | |

\* cited by examiner

CALIBRATION UNIT FOR A ROLLER NIP GAUGE

This application claims priority under 35 USC 119(a)-(d) to SE patent application No. 1450052-4, which was filed on Jan. 20, 2014, the entire content of which is incorporated herein by reference.

TECHNICAL FIELD

The present invention concerns a calibration unit for a roller nip gauge.

BACKGROUND

In different kinds of manufacturing and production processes there are nips between rollers. A nip may be formed when two rollers or cylinders are pressed against each other and is defined by the width of the nip and the pressure profile. A nip may also be formed when a substrate is received between two rollers, where the rollers have a gap between each other without any substrate there between. The nip is either performing a transportation function or a modification function of a substrate or fluid. Nips may occur separate or in several steps in a process line. The nip is often formed of one soft roller and one hard roller pressed against each other or against a substrate. In some embodiments the nip is formed of two soft rollers or two hard rollers. As a soft roller normally has a coating formed of a rubber polymer, its characteristics, such as elasticity and hardness, will change over time, depending mainly on mechanical treatment, working temperature and influence of chemicals.

In order to over time guarantee the quality of the characteristics of the nip, it is desirable to measure important characteristic parameters, such as length of the nip and force applied in the nip, at an empirically established time interval. Such a measuring may be made by using a sensor in the form of a thin blade, which is placed in the nip between the rollers and which sensor then will measure either nip width or the pressure profile. For nips only formed if a substrate is placed between the two rollers, the sensor may be placed on a substrate dummy, simulating the normal thickness of the substrate. The measuring characteristics of the sensor must be monitored over time, in order for possible deviation to be noted or corrected. One example of such a roller nip gauge is given in WO 03/027623.

A sensor for length measurement may comprise two paths, one conductive path and one resistive path, each printed on a plastic substrate with a spacer sheet there between. A sensor for force measurement may comprise two plastic sheets with a printed measuring element placed there between.

By using a calibration unit the characteristics of the sensor may be monitored over time and possible changes may be documented in a quality system, or a calibration may be combined with an automatic adjustment of the changed characteristics of the sensor. Such an automatic adjustment can be achieved if the sensor during calibration at the same time is connected to its displaying measuring instrument.

SUMMARY

The calibration unit of the present application is in principle formed of two main parts, a lower part in which the sensor is to be placed and an upper part which applies a length or a force on the measuring element when closed. It should be possible to adapt the hand calibrator to sensors measuring nips of different lengths or different forces. The calibration unit is often used as a handheld unit.

The upper part of the calibration unit applies a predetermined and traceable length or force on the measuring element of the sensor. In the embodiment for calibration of length, a predetermined and traceable length is applied on the sensor by means of a force controlled beam having two transverse activation beams at a controlled distance. In the embodiment for calibration of force, a predetermined and traceable force is applied on a well defined activation area on the measuring element of the sensor. The force is applied by means of a force application plate. Both embodiments have normally a solid bottom plate having a sunken surface, which sunken surface has the same outer contour as the sensor to be calibrated. In calibration the sensor is placed in the sunken surface, guaranteeing a repeatable and steady position throughout the whole operating sequence. For force calibration an insert is sometimes placed in the bottom plate in order to guarantee that the counteracting plates are placed in parallel, which increases the performance, For calibration the sensor is placed on the lower part of the calibration unit. The upper part is then pressed down and automatically locked onto the lower part by means of at least two opposite hooks. Then the calibration/adjustment is carried out where after the unit is opened by pressing on the locking hooks. In force calibration often at least four locking hooks are used and the force may for instance be applied by activation of a knob, an arm or the like.

In length calibration it is extremely important that the transversal activation beams of the force controlled beam hits the sensor surface parallel with the surface of the lower part, where the sensor is placed. To accomplish this, the force controlled beam is suspended in a plate of spring steel, allowing the pressure beam to adjust itself to the lower part and thereby accomplish a perfect hitting surface for the activation beams, which is a requirement for a correct calibration. The force controlled beam is suspended in such a way that it is practically free floating and will automatically adapt its position to the position of the sensor to be calibrated, as received inside the calibration unit. The applied force is also important in order to have a repeatable and true calibration and this is accomplished by means of a compression spring, which is applied dead in the centre of the force controlled beam and presses it against the sensor and the lower part.

Also in force calibration it is extremely important that the parts placed on opposite sides of the sensor element of the sensor are in parallel. To accomplish this said parts are suspended in springs in such a way that they are practically free floating and will automatically adapt their positions to each other to be in parallel.

Both the calibration unit for length and pressure may be equipped with different lengths and forces, respectively. The traceability of the activation is established by a calibrated slide calliper for the length activation and a calibrated load cell for the force activation.

Further objects and advantages of the present invention will be obvious to a person skilled in the art when reading the detailed description below of preferred embodiments.

BRIEF DESCRIPTION OF THE DRAWINGS

The present invention will be described further below by way of example and with reference to the enclosed drawings. In the drawings.

DETAILED DESCRIPTION

Figure 1:
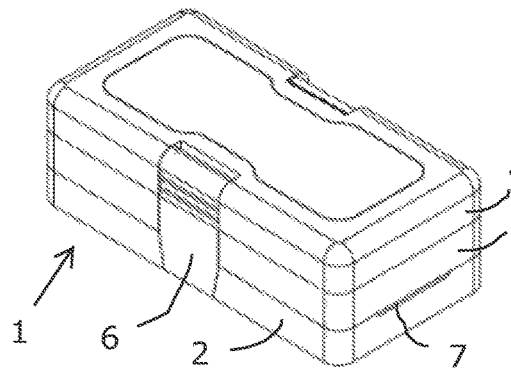
FIG. 1 is a perspective view of a calibration unit according to the present invention.
Figure 2:
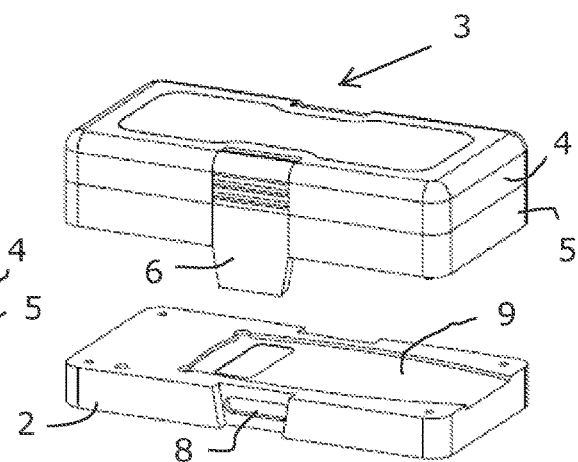
FIG. 2 is a perspective view illustrating the two main parts of the calibration unit of FIG. 1.
Figure 3:
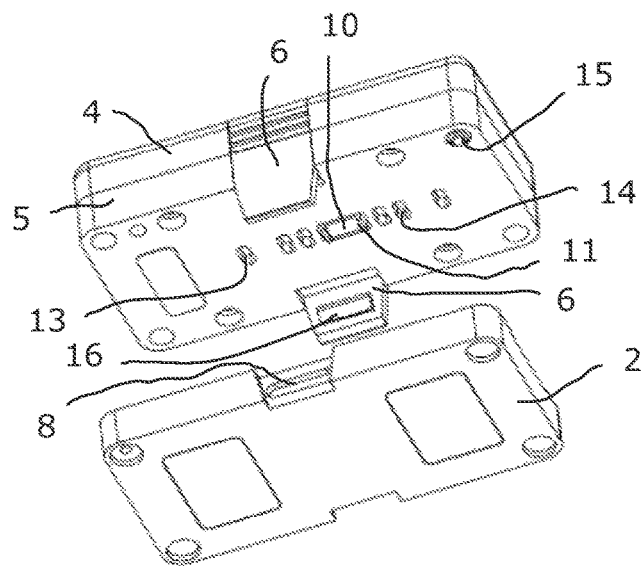
FIG. 3 is a perspective view corresponding to FIG. 2, but from a different angle.
Figure 4:
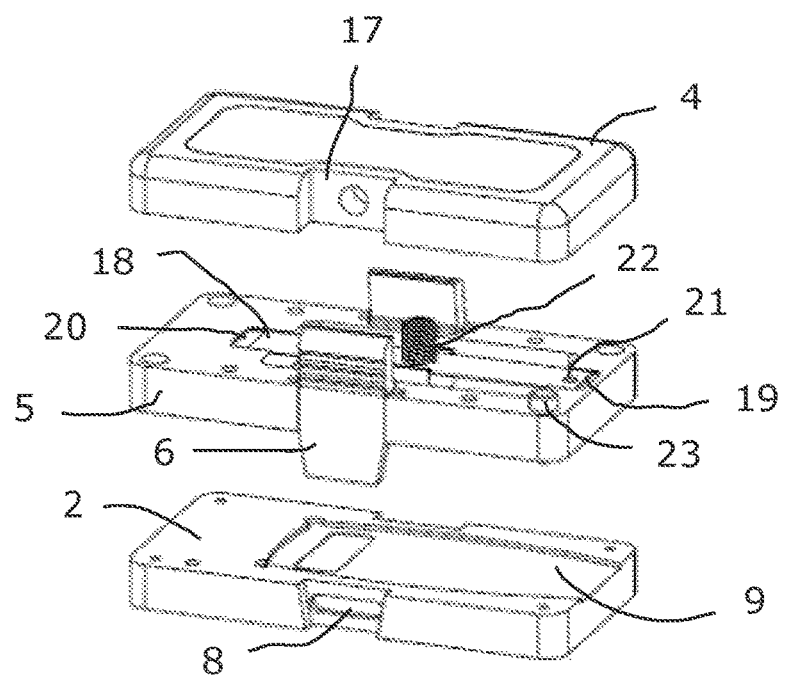
FIG. 4 is a perspective view illustrating the calibration unit divided into three parts.
Figure 5:
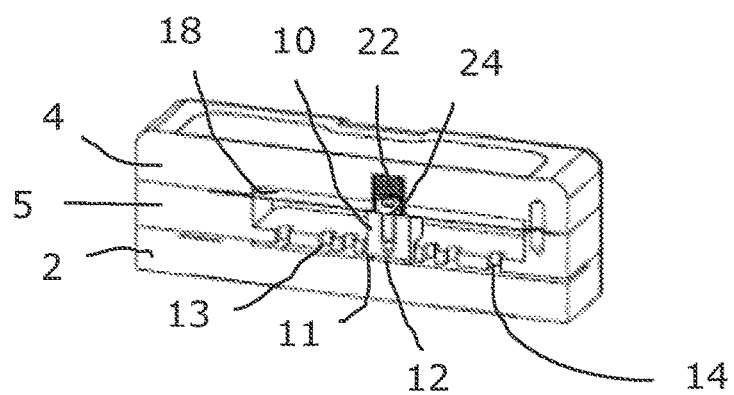
FIG. 5 is a sectional view of the calibration unit of FIG. 1.

As used herein the expressions "upper", "lower", "middle" and similar expressions refer to direction in normal use of the hand calibrator according to the present invention and as shown in the enclosed Figs.

In the embodiment shown in FIGS. 1-5 the calibration unit 1, comprises two main parts, a lower part 2 and an upper part 3, which parts are attached to each other during calibration. The upper part 3 is further divided into a top part 4 and a middle part 5. In use the middle part 5 of the calibration unit 1 is placed between the top part 4 and the lower part 2.

Two hooks 6 are received on the middle part 5. The hooks 6 act to connect and release the lower part 2 and the upper part 3 to and from each other. The top part 4 and middle part 5 of the upper part 3 are held together by means of screws or other fastening means. The upper parts of the hooks 6 are received in cavities 17 of the top part 4.

In the interconnected condition protruding parts 16 of the hooks 6 of the middle part 5 are received in cavities 8 of the lower part 2, to lock the lower part 2 and the upper part 3 to each other. A gap 7 is formed between the lower part 2 and the upper part 3 to receive a sensor 25, in a way further described below. The lower part 2 has a sunken surface 9 on the side facing the upper part 3.

Figure 6:
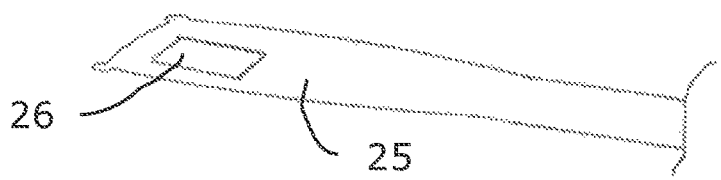
FIG. 6 is a perspective view of one example of a sensor element to be calibrated with the calibration unit of the present invention.
Figure 7:
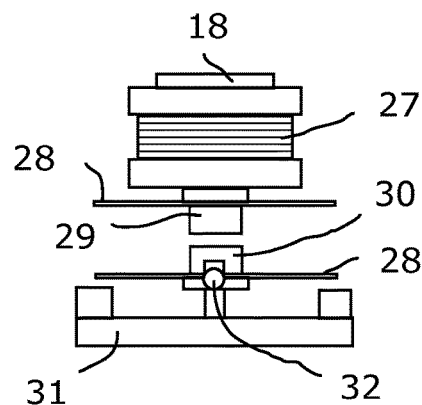
FIG. 7 is a schematic view in section of a part of a calibration unit adapted for force calibration.

The sunken surface 9 is to receive the sensor 25 and the contour of the sunken surface 9 corresponds with the outer contour of the sensor 25 to be calibrated. The sensor 25 has a sensor element 26, which is to be placed and calibrated inside the calibration unit 1. The sensor 25 has different sizes and structures depending on whether length or force is to be measured and depending on the nip to be measured. In FIG. 6 basically only the part of the sensor 25 to be received inside the calibration unit 1 is schematically shown. The other end of the sensor 25 is to be received in a measuring instrument. The sensor 25 is thereby given a well defined and secure position during calibration. Lower parts 2 with sunken surfaces 9 of different shapes are provided in order to be able to calibrate sensors 25 of different sizes and forms. Thus, the calibration unit will have a number of interchangeable lower parts. The gap 7 formed between the lower part 2 and the upper part 3 is formed by means of the sunken surface 9.

Protruding from the surface of the middle part 5, facing the lower part 2, are two activation beams 11. The activation beams 11 are placed transversally at opposite ends of a force controlled beam 10. The two activation beams 11 each normally have a relatively thin lower edge, giving a line contact with the sensor. In an alternative embodiment the activation beams are replaced by the edges of a constant surface protruding downwards from the force controlled beam. In the shown embodiment the activation beams 11 are placed inside a central opening 12 of the middle part 5. The middle part 5 has a number of openings 13, 14 on opposite sides of the central opening 12, which further openings 13, 14 are used when a longer distance is to be calibrated. For such longer distances the force controlled beams used have activation beams placed at a distance from each other, which distance corresponds with the distance between two of the further openings 13, 14. The force controlled beam is always placed having its central part in the area of the central opening 12 of the middle part 5.

At the corners of the surface of the upper part 3, facing the lower part 2, spring biased guiding pins 15 (only one indicated in FIG. 3) are placed, in order to orientate the upper and lower parts 2, 3 to be parallel to each other and also to be placed straight above each other. The spring biased guiding pins 15 are also used in order to press the upper and lower parts 2, 3 in a direction from each other, giving a small gap. By this arrangement the manufacturing tolerance of the upper and lower parts 2, 3 may be less strict.

In order for not being able to place the different parts with the wrong mutual orientation a guiding pin may be placed at one corner for to be received in a corresponding opening. Such a guiding pin 23 is indicated on the upper surface of the middle part 5.

The fore controlled beam 10 is suspended in the middle of a rectangular flat spring 18. The rectangular flat spring 18 is held between the top part 4 and the middle part 5 of the upper part 3. The force controlled beam 10 is fastened to the flat spring 18 by means of a screw 24. One end of the flat spring 18 is received in a cavity 19 of the middle part 5 and the opposite end of the flat spring 18 is received in another cavity 20 of the middle part 5. The cavities 19, 20 are formed to not hinder a longitudinal movement of the flat spring 18. An opening 21 is placed in one end of the flat spring 18 and a pin, a screw or other suitable fastening element is to be received in said opening 21. Thus, one end of the flat spring 18 is fixed. The force controlled beam 10 and the flat spring 18 are placed in an empty space formed between the top part 4 and the middle part 5, except that the cavities 19, 20 of the middle part 5 faces a lower surface of the top part 4. A compression spring 22 is placed in a cavity in the top part 4, which compression spring 22 acts on the force controlled beam 10. Thus, one end of the compression spring 22 acts on the upper part of the cavity in the top part 4 and an upper surface of the force controlled beam 10. By this arrangement the force controlled beam 10 is suspended free floating.

In order to accomplish force application on a determined and parallel area, for the force calibration, the calibration unit 1 has an activation plate 29 and a counter force plate 30, each having a controlled texture in order to achieve 100% force coverage on the measuring element. The force is applied by means of an adapted compression spring 27, which is activated in the centre of the plates 29, 30 and thereby also in line with the centre of the measuring element. A number of interchangeable compression springs 27 are provided, in order to adapt the calibration unit 1 to the magnitude of the force to be applied. The compression spring 27 is placed in the upper part 3. In some embodiments the compression spring 27 is pre-tensioned by mechanically means reducing the distance between the plates between which the compression spring 27 is received. By the pre-tension the stroke of the compression spring 27 may be reduced compared to if the compression spring 27 is not pre-tensioned. In one embodiment (not shown) the lower part in force calibration is in principle the same as used in length calibration. In calibration the activation plate 29 applying force will act on the sensor 25 placed in the calibration unit. It is important that a lower surface of the activation plate 29, that is the surface abutting the sensor 25, is parallel with the counter force plate 30 on which the sensor 25 is placed. The activation plate 29 is suspended in a circular flat spring 28. The circular flat spring 28 is fixed to the part above it by means of fixation means received in through openings 34 at the outer circumference of the circular flat spring 28. In other embodiments the circular flat spring 28 is replaced by a rectangular flat spring. The circular flat spring 28 has a central through opening 35, in which the activation plate 29 is received. The central through opening 35 of the circular flat spring 28 is surrounded by a number of through grooves 36. In the shown embodiment there are through grooves 36 in three circumferential rings. In each circumferential ring there are three grooves 36 interrupted by a short bridge of material. By means of the circumferential grooves 36 the activation plate 29 is free to tilt to a certain degree, allowing it to be parallel with the surface on which the sensor 25 is placed in calibration.

In the shown example the counter force plate 30 is suspended in a circular flat spring 28 in the lower part 31 of the calibration unit. Said circular flat spring 28 has the same design as the previously described circular flat spring 28. A ball 32 is received in an inner space of the counter plate force 30, on which ball 32 the circular flat spring 28 is received. By having the spring 28 placed on a ball 32 possible skewness of the compression spring 27 will be taken up. In calibration the sensor element 26 of the sensor 25 is to be placed between the activation plate 29 and the counter force plate 30. As both the activation plate 29 and the counter force plate 30 are freely suspended in one circular flat spring 28 each, the surfaces of respective part facing the sensor element will automatically be placed parallel with each other.

By the shown embodiment, using two circular flat springs 28, an even better adaptation to a compression spring 27 possibly acting somewhat uneven is achieved. A compression spring 27 acting uneven may exert larger forces in some areas than in others.

Figure 8:
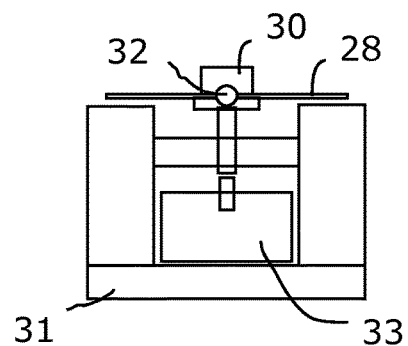
FIG. 8 is a schematic view of a special lower part.
Figure 9:
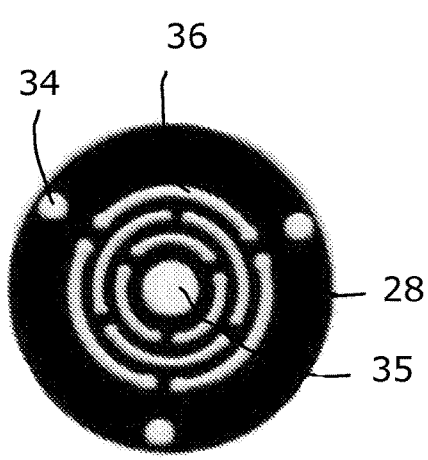
FIG. 9 is a plan view of a flat spring used in the embodiment of FIG. 7.

By arranging the lower part with a counter force plate 30 as indicated in FIG. 8, control of the force applied by the compression spring 27 of the calibration unit is facilitated. For the control of the force, the lower part may be replaced by a special lower part 31. In the special lower part 31 a counter force plate 30 is suspended in a circular flat spring 28 in the same way as described above. The counter force plate 30 is placed on a load cell 33, which load cell 33 is to control the force applied by means of the compression spring 27. When controlling the force applied by the compression spring 27, a sensor element is normally placed between the activation plate 29 and the counter force plate 30, in order to correspond with the calibration situation.

Figure 10:
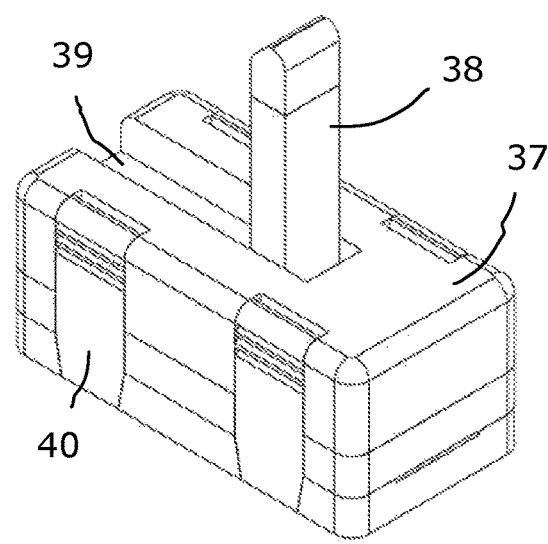
FIG. 10 is a perspective view of an alternative embodiment of the calibration unit according to the present invention.

In FIG. 10 one example of a calibration unit 37 for force calibration is shown. This calibration unit 37 has an arm 38, which may be turned from a shown activated position to an inactivated position, wherein the arm 38 is received inside a groove 39. In the shown example the calibration unit 37 have four hooks 40 to connect a lower part to an upper part of the calibration unit 37, in the same way as described above for the shown calibration unit 1 for length calibration. In other embodiments the arm may be replaced by other means to apply a force, such as a knob or a screw.

Figure 11:
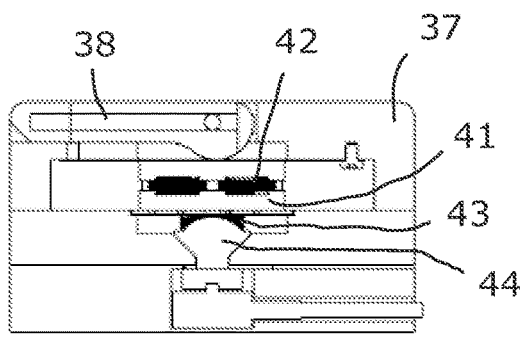
FIG. 11 is a section view of the calibration unit of FIG. 10, with an arm in a first position.
Figure 12:
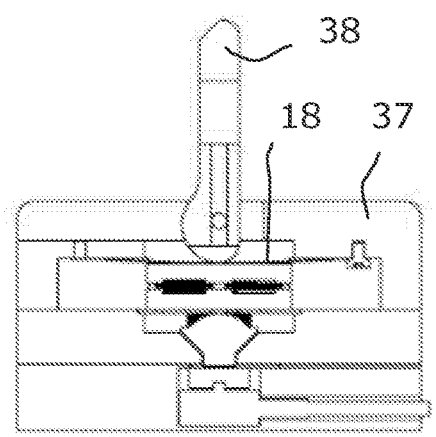
FIG. 12 is a section view corresponding to FIG. 11, but with the arm in another position.
Figure 13:
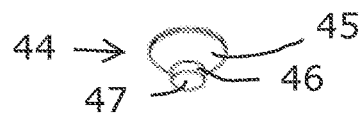
FIG. 13 is a perspective view of a part of the calibration unit of FIGS. 10 to 12.

In FIG. 11 the calibration unit of FIG. 10 is shown in a non-activated position, while it is shown in an activated position in FIG. 12. The arm 38 is to act on a spring package 41, comprising one or more springs 42. In other embodiments only one spring may be used, compare with the embodiment shown in FIGS. 4 and 5. A person skilled in the art realises that in the embodiment of FIGS. 4 and 5 the only spring may be replaced by a spring package as described here. In the spring package 41 often three or more springs 42 are placed in a circular form. The number of springs 42 used often depends on the force to be generated. The arm 38 abuts the rectangular flat spring 18, which is pressed downwards when the arm 38 is in the activated position. The spring package 41 acts on a force applicator 44, which force applicator 44 applies a calibration force to the sensor to be calibrated. The force applicator 44 has a conical part 45 with a domed upper surface, and a pin part 46. A lower contact surface 47 of the pin part 46 is to be placed on the sensor at calibration. A spring 43 at the upper end of the force applicator 44 will act together with the doomed upper surface to adapt the position of the force applicator 44 to any irregularities. If wanted the contact surface 47 of the force applicator 44 may be made to correspond with the surfaces in which the sensor should be used. It could be done by working the contact surface 47, for instance by grinding, or by applying any material, for instance rubber, by means of an adhesive.

Figure 14:
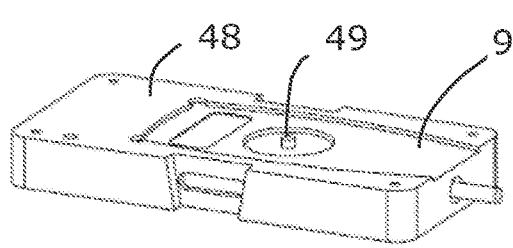
FIG. 14 is a perspective view of a lower part used for controlling the spring force of the calibration unit for length measurement.
Figure 15:
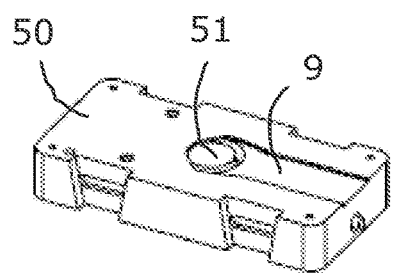
FIG. 15 is perspective view of a further lower part used for controlling the spring force of the calibration unit for force measurement.

For a proper calibration, the calibration units should be controlled from time to time. To control the spring force special lower parts may be used. In FIG. 14 a lower part 48 is shown, having a load cell 49 placed to control the spring force of a calibration unit. This lower part 48 is intended for calibration units for length measurement. The distance between the activation beams 11 is controlled by any suitable measuring device, such as a slide calliper. In FIG. 15 a lower part 50 is shown, which is intended for use with calibration units for force measurement. The lower part 50 has a load cell 51, placed to control the spring force of a calibration unit.

The invention claimed is:

1. A calibration unit for a roller nip gauge, the calibration unit comprising:
    an upper part;
    a lower part; and
    a mechanism to place a part acting on a sensor element of
        a sensor during calibration in parallel with a surface of
        the calibration unit receiving the sensor.

2. The calibration unit of claim 1, wherein the upper part is divided into a top part and a middle part;
    wherein the lower part has a sunken surface on the side
        facing the upper part;
    wherein the sunken surface is open at one side forming a
        gap between the lower part and the upper part; and wherein the sunken surface has an outer contour corresponding with the contour of the sensor to be received in the calibration unit.

3. The calibration unit of claim 2, wherein the lower part and the upper part are locked to each other by at least two hooks on the upper part co-operating with cavities on the lower part; and
   wherein the top part and the middle part of the upper part are fixed to each other.

4. The calibration unit of claim 2, wherein a flat spring is received between the top part and the middle part of the upper part;
   wherein opposite ends of the flat spring are received in cavities in the middle part;
   wherein a free space is formed between the top part and the middle part for the flat spring between the cavities in the middle part; and
   wherein one end of the flat spring is fixed with a fastener inside one of the cavities of the middle part while the opposite end of the flat spring is free to move longitudinally.

5. The calibration unit of claim 4, wherein a force controlled beam is fixed to the center of the flat spring;
   wherein the force controlled beam has transverse activation beams placed at a predetermined distance from each other at opposite ends of the force controlled beam; and
   wherein a compression spring acts on the flat spring directly over the force controlled beam.

6. The calibration unit of claim 5, wherein a plurality of interchangeable force controlled beams with activation beams placed at different distances are provided.

7. The calibration unit of claim 6, wherein the middle part of the upper part has a number of through openings for receiving the activation beams of the force controlled beam; and
   wherein the through openings are placed corresponding to the distance between the activation beams of the force controlled beam.

8. The calibration unit of claim 1, wherein a plurality of interchangeable lower parts are provided.

9. The calibration unit of claim 8, wherein each of the lower parts is adapted to control a spring force of the calibration unit using a load cell.

10. The calibration unit of claim 1, further comprising an activation plate, a counter force plate, and a compression spring.

11. The calibration unit of claim 10, wherein a plurality of interchangeable compression springs are provided.

12. The calibration unit of claim 10, wherein the activation plate and the counter force plate are suspended in one circular flat spring each.

13. The calibration unit of claim 10, used for force calibration.

14. The calibration unit of claim 1, used for length calibration.

* * * * *